United States Patent
Severance et al.

(10) Patent No.: US 10,030,145 B2
(45) Date of Patent: *Jul. 24, 2018

(54) REJUVENATION OF RECLAIMED ASPHALT

(71) Applicant: Kraton Chemical, LLC, Jacksonville, FL (US)

(72) Inventors: Rachel Severance, Savannah, GA (US); William Lewis Grady, Savannah, GA (US); David Jan Cornelius Broere, Amsterdam (NL); Laurent Porot, Almere (NL); Tresha Overstreet, Pooler, GA (US)

(73) Assignee: Kraton Chemical, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/364,862

(22) PCT Filed: Apr. 25, 2013

(86) PCT No.: PCT/US2013/038277
§ 371 (c)(1),
(2) Date: Jun. 12, 2014

(87) PCT Pub. No.: WO2013/163467
PCT Pub. Date: Oct. 31, 2013

(65) Prior Publication Data
US 2014/0338565 A1 Nov. 20, 2014

Related U.S. Application Data

(63) Continuation-in-part of application No. PCT/US2012/068994, filed on Dec. 11, 2012.

(60) Provisional application No. 61/638,989, filed on Apr. 26, 2012.

(51) Int. Cl.
| | |
|---|---|
| *C08L 95/00* | (2006.01) |
| *C08L 91/00* | (2006.01) |
| *C08K 3/34* | (2006.01) |
| *E01C 7/18* | (2006.01) |
| *E01C 11/00* | (2006.01) |

(52) U.S. Cl.
CPC .......... *C08L 95/00* (2013.01); *C08K 3/34* (2013.01); *C08L 91/00* (2013.01); *E01C 7/18* (2013.01); *E01C 11/00* (2013.01); C08L 2555/22 (2013.01); C08L 2555/24 (2013.01); C08L 2555/34 (2013.01); C08L 2555/64 (2013.01); Y02A 30/333 (2018.01); Y02P 20/582 (2015.11)

(58) Field of Classification Search
None
See application file for complete search history.

(56) References Cited

U.S. PATENT DOCUMENTS

| | | |
|---|---|---|
| 2,877,129 A | 3/1959 | Hardman |
| 4,154,710 A | 5/1979 | Maldonado et al. |
| 4,207,231 A | 6/1980 | Goodrich |
| 4,373,960 A | 2/1983 | Ward, Jr. |
| 4,479,827 A | 10/1984 | Ward |
| 4,492,781 A | 1/1985 | Duszak et al. |
| 4,549,834 A | 10/1985 | Allen |
| 4,806,166 A | 2/1989 | Schilling et al. |
| 5,180,428 A | 1/1993 | Koleas |
| 5,504,152 A | 4/1996 | Schluenz et al. |
| 5,536,307 A | 7/1996 | McGovern |
| 5,755,865 A | 5/1998 | Lukens |
| 5,766,333 A | 6/1998 | Lukens |
| 5,904,760 A | 5/1999 | Hayner |
| 6,117,227 A | 9/2000 | Kitagawa |
| 6,221,428 B1 | 4/2001 | Modrak |
| 6,290,152 B1 | 9/2001 | Zickell |

(Continued)

FOREIGN PATENT DOCUMENTS

| | | |
|---|---|---|
| CA | 608668 A | 11/1960 |
| CA | 2846931 A1 | 4/2013 |

(Continued)

OTHER PUBLICATIONS

Memon, G. M., et al. Glass Transition Measurements of Asphalts by DSC. Journal of Thermal Analysis, vol. 49 (1997) pp. 601-607.
Unknown. Standard Test Methods for Titer of Fatty Acids. ASTM Designation: D 1982-85 (Reapproved 1999).
International Search Report and Written Opinion, dated Jun. 20, 2013. PCT Application No. PCT/US2013/038271 filed Apr. 25, 2013.
International Search Report and Written Opinion, dated Jun. 20, 2013. PCT Application No. PCT/US2013/038277 filed Apr. 25, 2013.

(Continued)

*Primary Examiner* — Colin W. Slifka
(74) *Attorney, Agent, or Firm* — Samantha Page; Cantor Colburn LLP

(57) ABSTRACT

Asphalt compositions comprising reclaimed asphalt and a rejuvenating agent are disclosed. The reclaimed asphalt comprises aggregate and an aged binder. The rejuvenating agent, which has a cyclic content of at least 5 wt. %, comprises an ester or ester blend derived from an acid selected from aromatic acids, fatty acids, fatty acid monomers, fatty acid dimers, fatty acid trimers, rosin acids, rosin acid dimers, and mixtures thereof. The rejuvenating agent revitalizes the aged bitumen binder of reclaimed asphalt and restores its physical properties to those of the original performance-grade bitumen. Improvements include desirable softening, low-temperature cracking resistance, better fatigue cracking resistance, good elevated temperature performance, improved miscibility, and restored temperature sensitivity. The rejuvenating agents enable the use of higher levels of recovered asphalt, particularly RAP, in asphalt mixtures, reduce binder and aggregate costs, and help the road construction industry reduce its reliance on virgin, non-renewable materials.

16 Claims, No Drawings

(56) References Cited

U.S. PATENT DOCUMENTS

| | | |
|---|---|---|
| 6,495,074 B1 | 12/2002 | Carr |
| 6,641,896 B2 | 11/2003 | Fensel et al. |
| 6,696,125 B2 | 2/2004 | Zanchetta et al. |
| 6,764,542 B1 | 7/2004 | Lackey et al. |
| 7,008,670 B1 | 3/2006 | Freisthler |
| 7,256,162 B2 | 8/2007 | Pollock et al. |
| 7,357,594 B2 | 4/2008 | Takamura |
| 7,811,372 B2 | 10/2010 | Nigen-Chaidron et al. |
| 8,034,172 B2 | 10/2011 | Naidoo et al. |
| 8,076,399 B2 | 12/2011 | Laurens et al. |
| 8,679,245 B2 | 3/2014 | Reinke et al. |
| 8,789,773 B2 | 7/2014 | Teeter, Jr. et al. |
| 2002/0009572 A1 | 1/2002 | Davies |
| 2002/0058734 A1* | 5/2002 | Harlan ................ B01F 7/0045 524/59 |
| 2002/0068776 A1 | 6/2002 | Guo et al. |
| 2003/0201701 A1 | 10/2003 | Banicevic |
| 2005/0018864 A1 | 1/2005 | Minervini |
| 2007/0203265 A1 | 8/2007 | Pharr |
| 2008/0041276 A1 | 2/2008 | Riebesehl et al. |
| 2008/0069368 A1 | 3/2008 | Shumard |
| 2009/0137705 A1* | 5/2009 | Faucon Dumont ..... C04B 26/26 524/71 |
| 2009/0318602 A1 | 12/2009 | Deneuvillers |
| 2010/0034586 A1 | 2/2010 | Bailey et al. |
| 2010/0041798 A1 | 2/2010 | Nigen-Chaidron et al. |
| 2010/0147190 A1 | 6/2010 | Naidoo et al. |
| 2010/0170417 A1 | 7/2010 | Naidoo et al. |
| 2010/0184903 A1 | 7/2010 | Pharr |
| 2011/0015312 A1 | 1/2011 | Laurens et al. |
| 2012/0315088 A1 | 12/2012 | Deneuvillers et al. |
| 2013/0220175 A1 | 8/2013 | Zickell |
| 2014/0338565 A1 | 11/2014 | Severance et al. |
| 2015/0240081 A1 | 8/2015 | Grady et al. |

FOREIGN PATENT DOCUMENTS

| | | |
|---|---|---|
| DE | 19501212 A1 | 6/1996 |
| EP | 1721938 A2 | 11/2006 |
| EP | 1645595 B1 | 8/2008 |
| EP | 1466878 | 6/2014 |
| JP | 55-161853 | 12/1980 |
| JP | 2005-154467 | 6/2005 |
| JP | 2011-506634 | 3/2011 |
| JP | 2014-547349 | 12/2012 |
| RU | 220821 A1 | 12/1986 |
| RU | 1768548 A1 | 10/1992 |
| RU | 2004513 C1 | 12/1993 |
| WO | WO2001018122 A1 | 3/2001 |
| WO | WO2008019648 A1 | 2/2008 |
| WO | WO2010077141 A1 | 7/2010 |
| WO | WO2010110651 A1 | 9/2010 |
| WO | WO2013090283 A1 | 6/2013 |

OTHER PUBLICATIONS

Brown, E.R. Preventive Maintenace of Aphalt Concrete Pavements. Presentated at the 1988 Annual Meeting of the Transportation Research Board. Jan. 1988.

Brownridge, Jim. The Role of an Asphalt Rejuvenator in Pavement Preservation: Use and Need for Asphalt Rejuvenation. Copendium of Papers from the First International Conference on Pavement Preservation. 2010.

Elseifi, Mostafa et al. Reclaimed Asphalt Pavement—A Literature Review. A report of the findings of ICT R27-11, Determination of Usable Residual Asphalt Binder in RAP. Mar. 2007.

International Search Report and Written Opinion, dated Mar. 7, 2013. PCT Application No. PCT/US2012/068994 filed Dec. 11, 2012.

Mellema, Todd. Seal Coats and Rejuvenators. 38th Annual Rocky Mountain Asphalt Conference and Equipment Show. 2011.

O'Sullivan, Karen A. Rejuvenation of Reclaimed Asphalt Pavement (RAP) in Hot Mix Asphalt Recycling with High RAP Content. A Thesis Submitted to the Faculty of the Worcester Polytechnic Institute. Apr. 2011.

Search Report dated May 7, 2012, EP Application No. 11192991.5 filed Dec. 12, 2011.

* cited by examiner

REJUVENATION OF RECLAIMED ASPHALT

FIELD OF THE INVENTION

The invention relates to reclaimed asphalt compositions and rejuvenation thereof with ester-functional compositions having cyclic content.

BACKGROUND OF THE INVENTION

Reclaimed asphalt includes reclaimed asphalt pavement (RAP), reclaimed asphalt shingles (RAS), asphalt reclaimed from plant waste, and asphalt recovered from roofing felt, among other sources.

Asphalt pavement is one of the most recycled materials in the world, finding uses in shoulders of paved surfaces and bridge abutments, as gravel substitutes on unpaved roads, and as a replacement for virgin aggregate and binder in asphalt pavements. Recycled asphalt pavement is typically limited, however, to use as sub-surface "black rock" or in limited amounts in asphalt base and surface layers. The usefulness of recycled material in the critical surface layers is limited because asphalt deteriorates with time; it loses flexibility, becomes oxidized and brittle, and tends to crack, particularly under stress or at low temperatures. The effects are due to aging of the organic component of the asphalt, i.e., the bitumen-containing binder, particularly upon exposure to weather. The aged binder is also highly viscous. Consequently, reclaimed asphalt pavement has different properties than virgin asphalt and is difficult to process. Untreated RAP can be used only sparingly; generally, an asphalt mixture comprising up to 30 wt. % of RAP can be used as sub-surface black rock. Moreover, because of the higher demands of the pavement surface, untreated RAP use there is generally limited to 15-25%.

Reclaimed asphalt can be blended with virgin asphalt, virgin binder, or both (see, e.g., U.S. Pat. No. 4,549,834). Rejuvenating agents have been developed to increase the amount of reclaimed asphalt that can be incorporated in both the base and surface layers. Rejuvenating agents restore a portion of the asphalt paving properties and binder bitumen physical properties, such as viscoelastic behavior, so that the reclaimed asphalt properties more closely resemble those of virgin asphalt. Improving the properties of recycled asphalt, and particularly the properties of bitumen binder in RAP, allows increased amounts of RAP to be used in asphalt mixtures without compromising the properties and lifetime of the final pavement.

Commonly used rejuvenating agents for RAP include low-viscosity products obtained by crude oil distillation or other hydrocarbon oil-based materials (see, e.g., U.S. Pat. No. 5,766,333 or 6,117,227).

Rejuvenating agents of plant origin have also been described. See, for example, U.S. Pat. No. 7,811,372 (rejuvenating agents comprising bitumen and palm oil); U.S. Pat. No. 7,008,670 (soybean oil, alkyl esters from soybean oil, and terpenes used for sealing or rejuvenating); U.S. Pat. Appl. Publ. No. 2010/0034586 (rejuvenating agent based on soybean, sunflower, rapeseed, or other plant-derived oils); and U.S. Pat. Appl. Publ. No. 2008/0041276 (plasticizers for recycled asphalt that may be vegetable oils or alkyl esters made from vegetable oils). U.S. Pat. No. 8,076,399 describes a binder composition comprising a resin of vegetable origin, a vegetable oil, and a polymer having anhydride, carboxylic acid, or epoxide functionality, but this binder is not specifically taught for rejuvenation. Although vegetable oils can provide desirable softening of aged binders, they tend to have average-to-poor miscibility with binders, which typically have substantial polycyclic aromatic character. Consequently, vegetable oils are prone to leaching, and they do not help binders retain native oils.

Aged binders, especially those that are severely aged, have viscoelastic properties that respond less than virgin bitumen to temperature changes, i.e., they have lower "temperature sensitivity." A desirable rejuvenator will have the ability to alter or restore this property in an aged binder, in addition to or separate from softening the aged binder. Temperature sensitivity can be evaluated using dynamic shear rheometry (DSR) techniques described in more detail below. Thus, temperature sensitivity and softening are both important, but they are distinct restoration modes for transforming aged binders to rejuvenated ones having properties more reminiscent of virgin binders.

More recently introduced are rejuvenating agents derived from cashew nut shell oil, which contain mostly cardanol, a phenolic compound having a C15 unsaturated chain (see, e.g., PCT Internat. Publ. Nos. WO 2010/077141 and WO 2010/110651). Such products are available commercially from Ventraco Chemie, B.V., such as RheoFalt® HP-EM.

Various fractions isolated from crude tall oil (CTO) distillation have been used in asphalt compositions, although they are not specifically taught for rejuvenation. See, for instance, U.S. Pat. Appl. Publ. No. 2010/0170417 (CTO distillation fractions as cutting solvents use in asphalt compositions); U.S. Pat. No. 8,034,172 (distilled or oxidized tall oil components for use in asphalt compositions); and U.S. Pat. Nos. 4,479,827 and 4,373,960 (patching compositions comprising asphalt, tall oil, and possibly an organopolysiloxane).

Esters made from tall oil fatty acid (TOFA), tall oil rosin, tall oil pitch, or downstream products of CTO, such as Monomer acid (a unique product described, e.g., in U.S. Pat. No. 7,256,162), dimer acids, or the like, have not been previously suggested for use as rejuvenating agents for reclaimed asphalt.

Rosin esters have been taught sporadically for use in asphalt compositions. For example, they can be stabilizers for asphalt pre-mixes (U.S. Pat. No. 4,207,231), components of liquid emulsions (U.S. Pat. No. 4,492,781) or hot-mix asphalt formulations (U.S. Pat. No. 6,221,428), or asphalt binder components (U.S. Pat. No. 8,076,399).

Improved rejuvenating agents for reclaimed asphalt are needed. In particular, the industry needs additives for reclaimed asphalt that can improve low-temperature cracking resistance and fatigue cracking resistance while maintaining good rutting resistance. Better rejuvenating agents would reduce the cost of road construction by enabling greater use of RAP in new pavements and reducing reliance on virgin, non-renewable binder and aggregate materials. A preferred rejuvenating agent would reduce the binder viscosity to a level comparable to that of virgin binder and would also lower the glass-transition temperature of the binder to allow for softer, more easily processed asphalt mixtures. Ideally, the rejuvenating agent would derive from renewable resources, would have improved miscibility with aged binder to reduce its tendency to migrate from the binder, would have improved temperature sensitivity, and could restore the original performance grading to the binder.

SUMMARY OF THE INVENTION

In one aspect, our invention relates to an asphalt composition comprising reclaimed asphalt and a rejuvenating agent. The reclaimed asphalt comprises aggregate and an aged binder. The rejuvenating agent is present in an amount within the range of 0.1 to 20 wt. % based on the combined amounts of aged binder and rejuvenating agent. Additionally, the rejuvenating agent has a cyclic content of at least 5 wt. %. The rejuvenating agent comprises an ester or ester blend derived from an acid selected from aromatic acids, fatty acids, fatty acid monomers, fatty acid dimers, fatty acid trimers, rosin acids, rosin acid dimers, and mixtures thereof.

In another aspect, the rejuvenating agent comprises, in addition to the ester or ester blend, a polyterpene, a terpene phenol, a tall oil pitch, a tall oil pitch derivative, a sterol, an alkylated phenol, or an α-methylstyrene polymer.

In other aspects, the rejuvenating agent comprises a tall oil-derived fatty ester, a rosin ester, or a mixture thereof.

In some inventive asphalt compositions, the rejuvenating agent derives from an improved thermal stability alcohol. The rejuvenating agents for these compositions have exceptionally low cloud and pour points.

Our invention includes binder compositions suitable for use with reclaimed asphalt, methods for making the inventive asphalt and binder compositions, and paved surfaces comprising the inventive binders and asphalt compositions.

We found, surprisingly, that by incorporating certain ester-functional rejuvenating agents having adequate cyclic content we can revitalize the aged bitumen binder of reclaimed asphalt and generate rejuvenated binders with physical properties similar to those of the original performance-grade bitumen. The rejuvenated binders demonstrate reduced glass-transition onset temperatures, an indication of desirable softening of the aged, brittle binder. Results from dynamic shear rheometry experiments further validate the good low-temperature cracking resistance and improved fatigue cracking resistance of the rejuvenated asphalts. The DSR results show that rejuvenated binders also have good elevated temperature performance, which relates to rutting avoidance. Rutting is a common failure mode for asphalt road surfaces, particularly those that experience high traffic rates or high weight traffic.

In sum, the rejuvenating agents of our invention allow use of higher levels of recovered asphalt in asphalt mixtures. The rejuvenating agents provide desirable softening, but unlike vegetable oils and other alternatives, the inventive rejuvenating agents have better miscibility and are able to restore lost temperature sensitivity to the binder. This allows formulators to recover more of the properties of virgin binder when using even high levels of reclaimed asphalt in paving applications. Incorporating more recovered asphalt in roads lowers costs of both binder and aggregate and helps the road construction industry reduce its reliance on virgin, non-renewable materials.

DETAILED DESCRIPTION OF THE INVENTION

The invention relates to rejuvenation of asphalt compositions with an ester-functional rejuvenating agent. In particular, it relates to renewal of reclaimed asphalt, especially reclaimed asphalt pavement (RAP), which contains aggregate and aged asphalt binder.

In the literature, "asphalt" is sometimes used to describe the binder, and sometimes used to describe the binder plus the aggregate. In this description, "asphalt" refers to the composite material comprising a bituminous binder and aggregate, which is generally used for paving applications. Such asphalt is also known as "asphalt concrete." Asphalt is commonly quaffed for paving applications. Examples of asphalt grades used in paving applications include stone mastic asphalt, soft asphalt, hot rolled asphalt, dense-graded asphalt, gap-graded asphalt, porous asphalt, mastic asphalt, and other asphalt types. Typically, the total amount of bituminous binder in asphalt is from 1 to 10 wt. % based on the total weight of the asphalt, in some cases from 2.5 to 8.5 wt. % and in some cases from 4 to 7.5 wt. %.

"Reclaimed asphalt" includes reclaimed asphalt pavement (RAP), reclaimed asphalt shingles (RAS), reclaimed asphalt from plant waste, reclaimed asphalt from roofing felt, and asphalt from other applications.

"Reclaimed asphalt pavement" (RAP) is asphalt that has been used previously as pavement. RAP may be obtained from asphalt that has been removed from a road or other structure, and then has been processed by well-known methods, including milling, ripping, breaking, crushing, and/or pulverizing. Prior to use, the RAP may be inspected, sized and selected, for instance, depending on the final paving application.

"Aggregate" (or "construction aggregate") is particulate mineral material suitable for use in asphalt. It generally comprises sand, gravel, crushed stone, and slag. Any conventional type of aggregate suitable for use in asphalt can be used. Examples of suitable aggregates include granite, limestone, gravel, and mixtures thereof.

"Bitumen" refers to a mixture of viscous organic liquids or semi-solids from crude oil that is black, sticky, soluble in carbon disulfide, and composed primarily of condensed aromatic hydrocarbons. Alternatively, bitumen refers to a mixture of maltenes and asphaltenes. Bitumen may be any conventional type of bitumen known to the skilled person. The bitumen may be naturally occurring. It may be crude bitumen, or it may be refined bitumen obtained as the bottom residue from vacuum distillation of crude oil, thermal cracking, or hydrocracking. The bitumen contained in or obtained from reclaimed asphalt pavement is further referred to as bitumen of RAP origin.

"Virgin bitumen" (also known as "fresh bitumen") refers to bitumen that has not been used, e.g., bitumen that has not been recovered from road pavement. Virgin bitumen is a component of virgin binder. "Virgin binder" is binder that has not been used previously for road paving.

"Virgin asphalt" refers to a combination of virgin aggregate with virgin bitumen or virgin binder. Virgin asphalt has not been used previously for paving.

"Binder" refers to a combination of bitumen and, optionally, other components. The other components could include elastomers, non-bituminous binders, adhesion promoters, softening agents, additional rejuvenating agents (other than those of the invention), or other suitable additives. Useful elastomers include, for example, ethylene-vinyl acetate copolymers, polybutadienes, ethylene-propylene copolymers, ethylene-propylene-diene terpolymers, butadiene-styrene block copolymers, styrene-butadiene-styrene (SBS) block terpolymers, isoprene-styrene block copolymers and styrene-isoprene-styrene (SIS) block terpolymers, or the like. Cured elastomer additives may include ground tire rubber materials.

"Aged binder" refers to binder that is present in or is recovered from reclaimed asphalt. Normally, the aged binder is not isolated from the reclaimed asphalt. Aged binder has high viscosity compared with that of virgin bitumen as a result of aging and exposure to outdoor weather. In some instances, "aged binder" is also used herein to refer to virgin binder that has been aged using the RTFO and PAV laboratory aging test methods described herein. "Aged binder" may also refer to hard, poor-quality, or out-of-spec virgin binders that could benefit from combination with a rejuvenating agent, particularly virgin binders having a ring-and-ball softening point greater than 65oC by EN 1427 and a penetration value at 25oC by EN 1426 less than or equal to 12 dmm.

"Rejuvenating agent" refers to a composition or mixture that is combined with aged binder or reclaimed asphalt (or their mixtures with virgin binder and/or virgin asphalt) to revitalize the aged binder or reclaimed asphalt and restore some or all of the original properties of virgin binder or virgin asphalt.

"Derived from tall oil" means that the rejuvenating agent derives at least in part from a crude tall oil (CTO) component. CTO components include, e.g., tall oil fatty acid (TOFA), tall oil heads, tall oil rosin, and tall oil pitch. Tall oil derivatives suitable for making the ester-functional rejuvenating agents include acid-functional tall oil derivatives such as Monomer, dimer, and trimer acids made from TOFA, dimerized rosin acids, and refined fatty acids obtainable from tall oil.

The bitumen in the binder may be commercially available virgin bitumen such as a paving grade bitumen, i.e. suitable for paving applications. Examples of commercially available paving grade bitumen include, for instance, bitumen which in the penetration grade (PEN) classification system are referred to as PEN 35/50, 40/60 and 70/100 or bitumen which in the performance grade (PG) classification system are referred to as PG 64-22, 58-22, 70-22 and 64-28. Such bitumen is available from, for instance, Shell, Total and British Petroleum (BP). In the PEN classification the numeric designation refers to the penetration range of the bitumen as measured with the EN 1426 method, e.g. a 40/60 PEN bitumen corresponds to a bitumen with a penetration which ranges from 40 to 60 decimillimeters (dmm). In the PG classification (AASHTO MP 1 specification) the first value of the numeric designation refers to the high temperature performance and the second value refers to the low temperature performance as measured by a method which is known in the art as the Superpave$^{SM}$ system.

I. Binder Composition

In one aspect, the invention relates to a rejuvenated binder composition suitable for use with reclaimed asphalt. The binder composition comprises a combination of aged binder and a rejuvenating agent.

Suitable aged binder for use in the inventive compositions is present in or recovered from reclaimed asphalt, which can be RAP. Binder can be recovered from RAP by conventional means such as solvent extraction. The amount of binder in a reclaimed asphalt composition is generally known from the supplier, but it may also be determined by methods known to the skilled person. For instance, a known amount of RAP may be treated with a suitable solvent, e.g. dichloromethane to extract the binder. The weight amount of binder in the extracted fraction may be measured, thereby determining the content of binder in the RAP. The amount of binder in the RAP typically may range from 1 to 10 wt. % based on the total weight of the RAP, in particular from 2.5 to 8.5 wt. % and more particularly from 4 to 7.5 wt. %.

Preferably, aged binder is not isolated from the reclaimed asphalt. Instead, the reclaimed asphalt is simply combined with a desirable amount of rejuvenating agent. In a preferred approach, the rejuvenating agent is combined and mixed with virgin binder, reclaimed asphalt, and optionally virgin asphalt to give the rejuvenated asphalt product.

The rejuvenated binder compositions comprise 0.1 to 20 wt. %, preferably 0.5 to 10 wt. %, of the rejuvenating agent based on the combined amounts of aged binder and rejuvenating agent.

Suitable rejuvenating agents for use in the inventive binder compositions are described more fully below. Briefly, the rejuvenating agents have a cyclic content of at least 5 wt. %, and they comprise an ester or ester blend derived from an acid selected from aromatic acids, fatty acids, fatty acid monomers, fatty acid dimers, fatty acid trimers, rosin acids, rosin acid dimers, and mixtures thereof.

II. Asphalt Composition

In another aspect, the invention relates to an asphalt composition. The asphalt composition comprises reclaimed asphalt and a rejuvenating agent. The reclaimed asphalt comprises aggregate and an aged binder. The reclaimed asphalt, aggregate, and aged binder in the inventive composition are as defined above. Suitable rejuvenating agents are discussed in more detail below.

The Rejuvenating Agent

In the inventive asphalt and binder compositions, the rejuvenating agent is present in an amount within the range of 0.1 to 20 wt. %, preferably from 0.5 to 10 wt. %, based on the combined amounts of aged binder and rejuvenating agent.

The rejuvenating agent has a cyclic content of at least 5 wt. %, more preferably at least 10 wt. %. In certain aspects, the rejuvenating agent has a cyclic content 5 to 95 wt. %, preferably 10 to 90 wt. %.

By "cyclic content," we mean the percentage by weight of compounds in the rejuvenating agent that have one or more cycloaliphatic or aromatic rings as part of the structure. Thus, the cyclic content can come from mono-, bi-, tri-, or other polycyclic compounds. The rings can be fused or isolated. The rings are preferably 3-, 4-, 5-, 6-, or 7-membered, with 5- or 6-membered rings being more preferred. The rings may also contain one or more heteroatoms, e.g., oxygen, nitrogen, sulfur, or the like.

The rejuvenating agent comprises an ester or ester blend. The ester or ester blend derives from an acid selected from aromatic acids, fatty acids, fatty acid monomers, fatty acid dimers, fatty acid trimers, rosin acids, rosin acid dimers, and mixtures thereof.

1. Esters of Aromatic Acids

In some aspects, the rejuvenating agent comprises an ester derived from one or more aromatic acids. Suitable esters of aromatic acids include, for example, phthalates, isophthalates, terephthalates, benzoates, alkylated benzoates, naphthoates, anthroates, phenanthroates, and the like. Specific examples include dimethyl phthalate, dioctyl phthalate, dimethyl isophthalate, dimethyl terephthalate, dibenzyl phthalate, oleyl benzoate, and the like, and mixtures thereof.

2. Esters of Fatty Acids

Suitable fatty acid esters include esters of acids that are saturated or unsaturated, linear or branched, and preferably have 6 to 40, more preferably 8 to 30, most preferably 8 to 20, carbon atoms. Preferred fatty acid esters derive from $C_1$-$C_{18}$ alcohols. The fatty acid esters may derive from triglycerides, such as natural oils. Suitable fatty acid esters include, e.g., caprates, caprylates, azelates, ricinoleates, 12-hydroxystearates, isostearates, stearates, laurates, myristates, oleates, palmitates, linolates, linolenates, and the like. Because the fatty esters usually do not have cyclic content, they are normally combined with other materials that have cyclic content, such as rosin esters.

In a preferred aspect, the rejuvenating agent derives from tall oil fatty acid (TOFA) or a TOFA derivative (e.g., a TOFA dimer acid). Tall oil fatty acid is isolated from crude tall oil (CTO) by distillation. The CTO is a by-product of the Kraft wood pulping process. Distillation of CTO gives, in addition to tall oil fatty acid, a more volatile, highly saturated fraction of long-chain fatty acids (largely palmitic acid), known as "tall oil heads." Tall oil fatty acid is the next cut, which contains mostly C18 and C20 fatty acids having varying degrees of unsaturation (e.g., oleic acid, linoleic acid, linolenic acid, and various isomers of these). Another cut, known as distilled tall oil or "DTO," is a mixture of mostly tall oil fatty acid and a smaller proportion of tall oil rosin. Tall oil rosin ("TOR"), isolated next, consists largely of a $C_{19}$-$C_{20}$ tricyclic monocarboxylic acid. The bottom cut of the distillation is known as "tall oil pitch" or simply "pitch." Generally, any cut that contains at least some tall oil fatty acid is preferred for use in making an ester-functional rejuvenating agent.

3. Esters of Fatty Acid Monomers Dimers and Trimers

The rejuvenating agent may comprise an ester from a fatty acid monomer, dimer or trimer. Fatty acid monomer is obtained as a by-product of the processes used to dimerize or polymerize unsaturated fatty acids.

Unsaturated fatty acids are commonly polymerized using acid clay catalysts. Fatty acids having high levels of mono- or polyunsaturation are preferred. In this high-temperature process, the unsaturated fatty acids undergo intermolecular addition reactions by, e.g., the "ene reaction," to form polymerized fatty acids. The mechanism is complex and not well understood. However, the product comprises mostly dimerized fatty acid and a unique mixture of monomeric fatty acids. Distillation provides a fraction highly enriched in dimerized fatty acid, which is commonly known as "dimer acid." Such dimer acids are suitable for use in making the ester-functional rejuvenating agents.

The distillation of polymerized TOFA provides a fraction that is highly enriched in monomeric fatty acids and is known as "Monomer" (with a capital "M") or "Monomer acid." Monomer, a unique composition, is a preferred starting material for making ester-functional rejuvenating agents. Whereas natural source-derived TOFA largely consists of linear C18 unsaturated carboxylic acids, principally oleic and linoleic acids, Monomer contains relatively small amounts of oleic and linoleic acids, and instead contains significant amounts of branched and cyclic C18 acids, saturated and unsaturated, as well as elaidic acid. The more diverse and significantly branched composition of Monomer results from the catalytic processing carried out on TOFA during polymerization. The art recognizes that the reaction of Monomer with alcohols to make "Monomerate" esters will yield unique derivatives that differ from the corresponding TOFA-based esters. Monomer has been assigned CAS Registry Number 68955-98-6. Examples of Monomer products are Century® MO5 and MO6 fatty acids, products of Arizona Chemical Company. For more information about the composition of Monomer and its conversion to various esters, see U.S. Pat. No. 7,256,162, the teachings of which are incorporated herein by reference.

Specific examples of suitable ester-functional rejuvenating agents from monomer, dimer, and trimer fatty acids include, for example, ethylene glycol Monomerate, glycerol Monomerate, trimethylolpropane Monomerate, neopentyl glycol Monomerate, 2-ethylhexyl Monomerate, ethylene glycol dimerate, 2-ethylhexyl dimerate, 2-ethylhexyl trimerate, and the like.

4. Esters of Rosin Acids and Rosin Acid Dimers

Suitable rejuvenating agents include esters of rosin acids or rosin acid dimers. Rosin acids include mono-carboxylic acids with the general formula C19H29COOH, with a nucleus of three fused six-carbon rings and comprise double bonds that vary in number and location. Examples of rosin acids include abietic acid, neoabietic acid, dehydroabietic acid, pimaric acid, levopimaric acid, sandaracopimaric acid, isopimaric acid and palustric acid.

The rosin acid may be used in isolated form, or as part of a composition which may comprise a plurality of rosin acids. In particular, rosin may be used as a source of rosin acid. Rosin is a hydrocarbon secretion of many plants, particularly coniferous trees such as *Pinus palustris* and *Pinus caribaea*. Natural rosin typically consists of a mixture of seven or eight rosin acids, and other minor components. Rosin is commercially available and can be obtained from pine trees by distillation of oleoresin (gum rosin being the residue of distillation), by extraction of pine stumps (wood rosin) or by fractionation of tall oil (tall oil rosin). Any type of rosin may be used, including tall oil rosin, gum rosin and wood rosin. Tall oil rosin is typically used because of its availability. Examples of suitable commercially available rosins include tall oil rosins (e.g. Sylvaros® 85, Sylvaros® 90 or Sylvaros® 95 from Arizona Chemical).

The rosin acid may be modified prior to esterification, by, for instance, hydrogenation, dismutation, dimerization or oligomerization, Diels-Alder reaction, isomerization or combinations thereof. Rosin esters may also be modified to form disproportionated rosin esters. For example, dehydroabietic acid may be useful.

Rosin esters may be obtained from rosin acids and alcohols by methods known in the art (see, e.g., U.S. Pat. No. 5,504,152, the teachings of which are incorporated herein by reference). In general, rosins may be esterified by a thermal reaction of the rosin acid with the alcohol. In order to drive the esterification reaction to completion water may be removed from the reactor, by methods, such as distilling, application of vacuum, and others known to the skilled person.

Commercially available rosin esters may also be used, as for example Sylvatac® RE103, Sylvatac® RE55, Sylvatac® RE85, Sylvatac® RE12 and Sylvatac® RE5 all from Arizona Chemical; Eastman® ester Gum 15 D-M, Permalyn® 3100, Permalyn® 5110-C and Staybelite™ ester 3-E all from Eastman; Dertoline® G2L, Dertoline® SG2, Dertoline® P105, Dertoline® P110, Dertoline® P2L, Dertoline® PL5, Dertopoline P125, Granolite SG, Granolite P, Granolite P118 and Granolite TEG all from DRT (les Dérivés Résiniques & Terpéniques); and NovaRes® 1100 from Georgia Pacific.

The rosin ester may comprise some residual, unreacted acid and alcohol. Typically, the rosin ester has an acid number below 20 mg KOH/g, in particular below 15 mg KOH/g. The acid number may be determined by methods known to the skilled person, such as the standard method ASTM D974 which uses a color-indicator titration.

Suitable rosin esters are liquid rosin esters or may be solid rosin esters having a softening point of between 30 and 120° C., between 30 and 80° C., or between 40 and 60° C. The softening point may be determined by methods known to the skilled person, for instance, according to the standard method ASTM 28-99, which uses a method known as "ring and ball" method. Suitable rosin esters include esters of tall oil rosin, esters of gum rosin, and esters of wood rosin. Many alcohols and glycols are suitable for reacting with one or more rosins to make rosin esters. Examples include C8-C11 alkyl and isoalkyl alcohols and glycols, pentaerythritol, dipentaerythritol, glycerol, ethylene glycol, diethylene glycol, triethylene glycol, neopentyl glycol, and the like.

Additional Rejuvenating Agent Components

In some aspects, the ester-functional rejuvenating agent further comprises a polyterpene, a terpene phenol, a tall oil pitch, a tall oil pitch derivative, a sterol, an alkylated phenol, an α-methylstyrene polymer, or mixtures thereof. Suitable materials are well known and many are commercially available. Examples include Sylvares® terpene phenols such as Sylvares® TP 96, Sylvares® TP 105, and Sylvares® TP 115. Suitable polyterpenes include, for example, Sylvares® TR series polyterpenes such as Sylvares® TR 90, Sylvares® TR 105, and Sylvares® TR 125. Suitable α-methylstyrene polymers include, for example, Sylvares® SA series aromatic resins such as Sylvares® SA 100, Sylvares® SA 120, and Sylvares® SA 140 and α-methylstyrene phenolic resins, for example, Sylvares® 520, Sylvares® 525, and Sylvares® 540. All of the Sylvares® products noted above are products of Arizona Chemical.

In some aspects, the rejuvenating agent having at least 5 wt. % cyclic content comprises a tall oil-derived fatty ester, a rosin ester, or a mixture thereof. Preferably, the rejuvenating agent comprises 10 to 90 wt. % of the tall-oil derived fatty ester and 10 to 90 wt. % of a rosin ester. In other preferred rejuvenating agents, the fatty ester derives from an acid selected from fatty acid monomers, fatty acid dimers, and fatty acid trimers. In other preferred rejuvenating agents, the rosin ester derives from tall oil rosin, wood rosin, gum rosin, or mixtures thereof. In some aspects, the rosin ester derives from abietic acid, neoabietic acid, dehydroabietic acid, pimaric acid, levopimaric acid, sandaracopimaric acid, isopimaric acid, palustric acid, and mixtures thereof.

In a preferred aspect, the ester-functional rejuvenating agent for the inventive asphalt or binder composition derives from one or more improved thermal stability alcohols. By "improved thermal stability alcohol," we mean an alcohol that has a quaternary carbon located beta to the oxygen of any of its hydroxyl groups. Examples include trimethylolethane, trimethylolpropane, neopentyl glycol, pentaerythritol, dipentaerythritol, benzylic alcohols, and the like, and mixtures thereof. In particular, we found that rejuvenating agents in which at least part of the ester component derives from an improved thermal stability alcohol give rejuvenating agents with desirably low cloud points (preferably less than −20oC), low pour points (preferably less than −30oC), and good to excellent low-temperature properties (see Table 3, below).

In some aspects of the invention, the rejuvenating agents preferably have a flash point greater than 200oC, more preferably greater than 220oC, and most preferably greater than 250oC. The rejuvenating agents are preferably non-crystalline, preferably having a melting point or titer (by ASTM D1982 or similar method) at or below 30oC, more preferably below 20oC, and most preferably below 0° C.

Preferably, the rejuvenating agents have a cloud point below 0° C., more preferably below −10oC, even more preferably below −20oC, and most preferably below −25oC. Cloud point is found by cooling a neat, molten sample gradually and observing the temperature at which the clear sample just becomes hazy.

In some aspects, the rejuvenating agent is present in an amount effective to reduce the glass-transition onset temperature of the aged asphalt binder by at least 5oC, preferably by at least 10oC, compared with the glass-transition onset temperature of the aged asphalt binder without the rejuvenating agent. The glass-transition onset temperature can be determined by any desired method, but it is conveniently measured by differential scanning calorimetry (DSC) or by the peak of the loss modulus by bending beam rheometry (BBR). Transitions in the DSC curve are noted as samples are cycled through a programmed increase and/or decrease of temperatures. In plots of heat flow (W/g) versus temperature, inflection points denote the onset of glass transition and the endpoint. The temperature range between the onset temperature and the endpoint is the "spread." A desirable rejuvenating agent will lower the onset temperature of glass transition and will also narrow the spread. DSC has been used previously as a diagnostic tool for evaluating asphalt compositions; see, e.g., R. F. Turner and J. F. Branthaven, "DSC Studies of Asphalts and Asphalt Components" in Asphalt Science and Technology, A. M. Usnami, ed., Marcel Dekker, Inc., NY (1997), pp. 59-101.

We surprisingly found that certain rejuvenating agents having cyclic contents of at least 5 wt. %, when introduced at low to modest levels, can be effective in reducing the glass-transition onset temperature of aged asphalt binders by at least 5oC. The reduction is important because it correlates with an anticipated improvement in low-temperature cracking resistance in asphalt pavement. As the results in Table 1 (below) suggest, a variety of ester-functional rejuvenating agents, when used at 2.5 to 10 wt. % with aged asphalt binder, are effective in reducing the onset temperature of glass transition by at least 5oC. Many of the rejuvenating agents reduce the onset temperature of glass transition by at least 10oC, and some can reduce that temperature by as much as 20oC. On the other hand, other tested compositions are not effective in reducing the Tg onset temperature by at least 5oC at the 10 wt. % level. For instance, as shown in Table 1, high-hydroxyl rosin ester (C10) and terpene phenols (C12), among other classes, are ineffective in reducing the Tg onset temperature (see "Δ onset" column). Cardanol, the active component of another commercial rejuvenating agent (RheoFalt® HP-EM, product of Ventraco Chemie, B.V.), effectively reduces the Tg onset temperature, but cardanol is a long-chain unsaturated alkylate of a phenol and has no ester functionality.

In some preferred asphalt and binder compositions of the invention, the rejuvenating agent having at least 5 wt. % of cyclic content is present in an amount effective to reduce the glass-transition temperature spread (or melting range) by at least 5oC, preferably by at least 10oC. As shown in Table 1 (see "Δ spread" column), there are numerous examples of such rejuvenating agents that have this capability including, for example, ethylene glycol Monomerate, glycerol Monomerate, neopentyl glycol Monomerate, and others. Although somewhat less diagnostic than the reduction in Tg onset temperature, a narrower Tg spread for the binder generally indicates greater homogeneity, which can translate to better fatigue cracking resistance at ambient temperature for the asphalt compositions.

Further evidence of the value of ester-functional rejuvenating agents having at least 5 wt. % of cyclic content comes from dynamic shear rheometry (DSR) data. Rheology, the study of the deformation and flow of matter, provides a fingerprint of the viscoelastic behavior of a bitumen, whether virgin, aged, conditioned, or treated. This measured behavior is correlated to performance of the bitumen within the aggregate asphalt, and subsequently to the performance of the road. The tests performed function based on the principles of linear viscoelasticity and the superposition principle, where strain on a material is proportional to the stress received. A stress is applied to the sample and the response and delay of that response (phase angle) are analyzed and used to calculate moduli that represent different properties of the sample.

Particularly in the United States, DSR is used to evaluate asphalt products to assess their likely performance at low, ambient, and elevated temperatures. DSR can be used to test the rheological properties of the complex shear modulus (G*) and phase angle at a broad range of temperatures which can characterize both the viscous and elastic behavior of the sample.

At low temperatures (e.g., −10oC), road surfaces need cracking resistance. Under ambient conditions, stiffness and fatigue properties are important. At elevated temperature, roads need to resist rutting when the asphalt becomes too soft. Criteria have been established by the asphalt industry to identify rheological properties of a binder that correlate with likely paved road surface performance over the three common sets of temperature conditions.

Thus, for low temperatures, the complex modulus (G*) of the rejuvenated binder measured at −10oC should be less than or equal to the value for virgin binder. For 30/50 grade virgin binder, G* at −10oC is ideally at or below 2.8×108 Pa. Aged binder is not dramatically different from virgin binder in this property.

At ambient temperatures, the complex modulus of the rejuvenated binder should be less than or equal to the value for virgin binder. For 30/50 grade virgin binder, G* at 20oC is ideally at or below 6.0×106 Pa.

Fatigue criteria also relates to ambient temperature performance. The product of the complex modulus (G*) and the sine of the phase angle (δ) measured at 10 rad/s is determined. The temperature at which the value of G*sin δ at 10 rad/s equals 5.0×106 Pa should be less than or equal to 20oC for rejuvenated binders comparable to 35/50 grade virgin binder.

At high temperatures, the quotient G*/sin δ is of interest. The temperature at which the value of G*/sin δ at 10 rad/s equals 1000 Pa should be reduced for rejuvenated binders compared with that of aged binder. For 30/50 grade virgin binder, the temperature at which G*/sin δ at 10 raft equals 1000 Pa is about 70oC. The high-temperature criteria is generally satisfied with up to about 10 wt. % of ester-functional rejuvenating agent.

Table 2 shows the improvement in low-temperature performance, particularly m-value and creep stiffness at −15oC. EG Monomerate and glycerol Monomerate, for example, perform well when compared with terpene phenols. At ambient temperatures, the rejuvenating agents provide a palpable reduction in G*sin δ of RAP binder, an indication of improved fatigue cracking properties in the ultimate asphalt composition. The benefits for low- and ambient-temperature performance are significant, but too often such benefits are obtained only by sacrificing elevated temperature properties such as resistance to rutting. As shown in Table 2, however, the low values (versus the control) of G*/sin δ determined at 70oC indicate that binders containing the rejuvenating agents will likely also perform well at elevated temperature. The test results are used to predict the amount of rut formation to be expected from use of a particular binder. The results in Table 2 suggest that softening of the binder by the rejuvenating agent will not create a rutting problem for the ultimate asphalt compositions, even on hot summer days.

In one preferred aspect, the rejuvenating agent comprises an ester or ester blend derived from one or more low-temperature alcohols. By "low-temperature alcohol," we mean an alcohol that has a quaternary carbon located beta to the oxygen of any of its hydroxyl groups. Examples include trimethylolethane, trimethylolpropane, neopentyl glycol, pentaerythritol, dipentaerythritol, benzylic alcohols, and the like. In particular, we found that rejuvenating agents in which at least part of the ester component derives from a low-temperature alcohol give rejuvenating agents with desirably low cloud points, low pour points, and good to excellent low-temperature properties (see Table 3, below).

In other aspects, the rejuvenating agent has improved miscibility. Miscibility is the ability of one material to form a homogeneous solution with another. The miscibility of an additive with bitumen correlates to the likelihood of the additive staying in the bitumen during and after mixing and application. An additive demonstrating low miscibility with bitumen will be more likely to have higher mass loss during mixing or leach into the aggregate over time, thereby negating any benefit gained by adding it. We found (see Table 4, below) that cyclic compositions such as rosin esters and rosin ester blends demonstrate good to excellent miscibility with aged binder in a suitable test method, indicating a reduced tendency to leach, as is seen, e.g. with vegetable oil or hydrocarbon waxes. Moreover, the cyclic content of the inventive rejuvenating agents may assist the aged binder in retaining its own native oils.

In certain aspects, the rejuvenating agent is added in an amount effective to both soften the aged binder and restore its temperature sensitivity compared with that of an aged binder without the rejuvenating agent.

Temperature sensitivity is a rheological measure of a binder's viscoelastic response to temperature changes. The ability of an additive to alter or restore this property in aged binder serves as a gauge of additional restoration effects apart from softening. An effective change in temperature sensitivity for the rejuvenated binder can be indicated by either an increase or a decrease in the slope of G*, G*sin δ, or G*/sin δ as compared to the aged binder. This slope change can be seen by the relative location of points on an xy plot with fatigue criteria on the vertical axis (i.e., the temperature in oC at which G*sin δ at 10 rad/s=5.0×106 Pa) versus high-temperature criteria on the horizontal axis (i.e., the temperature in oC at which G*/sin δ at 10 rad/s=1000 Pa).

Table 8 below illustrates that compositions that offer the best temperature sensitivity and ability to restore properties of virgin binder to the aged material tend to have a high content of cyclic components (e.g., aromatic esters, rosin esters, dimerized rosin esters). Note the relatively low capability of vegetable oils, petroleum flux oils, or fatty esters to restore by altering the temperature sensitivity. Because the cyclic-containing compositions are not as good at softening bitumen when they are the sole component, a combination of cyclic and acyclic compositions can be used to strike a more favorable balance of good softening and good temperature sensitivity.

The inventive asphalt and binder compositions can be made by combining components in any desired order. In one convenient approach, an asphalt composition is made by combining rejuvenating agent with virgin binder, then blending the resulting mixture with RAP. In another approach, the asphalt composition is made by combining rejuvenating agent with RAP, optionally with virgin asphalt.

Asphalt compositions of the invention preferably contain rejuvenating agent, 5 to 95 wt. % RAP, and at least some virgin binder. More preferred asphalt compositions contain 10 to 90 wt. % RAP, most preferably 30 to 90% RAP. Other preferred compositions comprise 1 to 99 wt. %, preferably 10 to 90 wt. %, more preferably 30 to 70 wt. % of virgin binder.

In one aspect, the invention relates to an asphalt composition comprising reclaimed asphalt and an ester-functional rejuvenating agent derived from tall oil as described above, wherein the asphalt composition further comprises virgin asphalt. The virgin asphalt comprises virgin binder and virgin aggregate. The asphalt composition comprises 1 to 99 wt. % of virgin aggregate based on the combined amounts of virgin asphalt, reclaimed asphalt, and rejuvenating agent.

Depending on the source, age, history, any pretreatment, and other factors, RAP will normally contain from 2 to 8 wt. %, more typically 3 to 6 wt. %, of aged asphalt binder. Therefore, the effective amount of rejuvenating agent can vary by asphalt source. In general, the rejuvenating agent is preferably used at 0.1 to 15 wt. %, more preferably 0.5 to 10 wt. %, even more preferably 2 to 8 wt. %, most preferably 3 to 6 wt. %, based on the amount of aged asphalt binder.

Inclusion of the rejuvenating agent in reclaimed asphalt can facilitate handling of the asphalt composition in one or more plant operations. Thus, in one aspect, the rejuvenating agent reduces the temperature required for mixing, at viscosities less than or equal to 200 mPa·s, by at least 5oC, preferably by at least 10oC. When high temperatures are needed to reach a viscosity of 200 mPa·s, the process can consume too much energy to be cost-effective. Thus, any reduction in the temperature needed to reach a reasonable viscosity for mixing is valuable. In another aspect, the rejuvenating agent reduces the temperature required for compaction, at viscosities less than or equal to 3000 mPa·s, by at least 5oC, preferably by at least 10oC. When high temperatures are needed to reach a viscosity of 3000 mPa·s, the process can consume too much energy to be cost-effective. Thus, any reduction in the temperature needed to reach a reasonable viscosity for compaction is valuable. The rejuvenating agents can be effective in reducing the minimum temperature required for both mixing and compaction.

The invention includes uses for the asphalt compositions or binders of the invention. The asphalt compositions and binders can be used, e.g., for paved surfaces, road surfaces and subsurfaces, shoulders, bridges, bridge abutments, gravel substitutes for unpaved roads, and the like. In one aspect, the invention relates to a paved surface comprising an asphalt or binder composition of the invention.

The following examples merely illustrate the invention; the skilled person will recognize many variations that are within the spirit of the invention and scope of the claims.

Evaluation of Tall Oil-Derived Rejuvenating Agents in Reclaimed Asphalt Pavement: Reduction of Tg Onset Temperature in Aged Binders Method for Preparing RAP Binder with Rejuvenating Agents RAP is received in 40-lb. bags. Material is removed from the bag and allowed to air dry until no visible moisture remains. A sieve table with multiple gauge wire is utilized to separate the material into different sizes: large, medium, and fines.

The material classified as "large" is placed into a large fritted column with glass wool used as the primary filtration. Toluene/ethanol (85:15) is poured over the RAP and allowed to stand until gravity filtration is complete. The process is repeated multiple times until the solvent blend is almost void of coloration and clear. The "medium" and "fines" material is placed into a large Erlenmeyer flask, after which the same solvent blend is added to level. The material is agitated and the resultant solvent/asphalt mix is decanted. This process is also repeated to the same target.

The combined extracts are charged to a 5-gal. container and allowed to sit for 24 h to allow any dirt/rock fines to settle. The material is carefully decanted through a medium grade filter (Whatman #4). The filtrate is charged in batches to a 5-L flask, and the solvent is stripped under vacuum while warming to 40-50oC. Concentration continues until the material reaches a solids target of ~20-25%. All concentrated material is combined into a single container and the solvent is recovered and recycled.

Using the solids content as a guideline, concentrated material is charged to a 50-mL round-bottom flask based on a 2 g target. Additives to be evaluated are diluted to a minimum of 50% with toluene and charged to the same round bottom targeting a total addition of 0.2 g. The solution is then stripped under vacuum using a 150° C. oil bath for 0.5 h. The concentrated product remains under a nitrogen purge until it cools.

Differential Scanning Calorimetry (DSC) Analysis of Samples

Differential scanning calorimetry analysis is performed using a Thermal Analysis Inc. model Q2000 instrument using the following conditions: sample weight: 4-6 mg RAP; sample containment: TA Inc. standard aluminum pans and lids (TA Inc. part numbers 900786.901 and 900779.901); instrument purge: nitrogen, 50 mL/min.

Temperature program: Metrics for Tg are applied to data from segment (23) of the following method log: (1) Sampling interval 0.60 sec/pt; (2) zero heat flow at 0.0° C.; (3) equilibrate at 165.00° C.; (4) data storage off; (5) isothermal for 5.00 min; (6) mark end of cycle 1; (7) data storage on; (8) ramp 5.00° C./min to −45.00° C.; (9) data storage off; (10) isothermal for 5.00 min; (11) mark end of cycle 2; (12) data storage on; (13) ramp 10.00° C./min to 165.00° C.; (14) data storage off; (15) isothermal for 5.00 min; (16) mark end of cycle 3; (17) data storage on; (18) ramp 5.00° C./min to −85.00° C.; (19) data storage off; (20) isothermal for 5.00 min; (21) mark end of cycle 4; (22) data storage on; (23) ramp 10.00° C./min to 165.00° C.; (24) mark end of cycle 5; (25) end of method.

Curves are generated by plotting heat flow (W/g) as a function of temperature (oC) over the range of −80oC to 80oC. Inflection points representing the onset of glass transition and the end of glass transition are noted, and a midpoint is determined. The "spread" is the difference between the temperature at the end of glass transition and the glass transition onset temperature. Thus, for a sample having an onset Tg at −36oC and an endpoint at 10oC, the spread is reported as 46oC. The values of Δ onset and Δ spread (each in oC) for each sample are reported in comparison to the average values obtained for multiple runs of the control sample of aged asphalt binder. The tested samples contain 90 wt. % of aged asphalt binder and 10 wt. % of potential rejuvenating agent additive unless otherwise noted in Table 1.

A measurable impact on low-temperature properties of the RAP is expected if the onset of glass transition can be reduced by at least 5oC, and each of Examples 1-6 and 13-27 (Table 1) satisfies this requirement. Rheofalt® distillate (cardanol), a long-chain alkylated phenol that is the principal component of a commercial rejuvenating agent, is provided for comparison.

Reduced fatigue cracking is normally inferred from improved homogeneity, which correlates with a narrower spread of the glass-transition temperature. Thus, an improvement in fatigue cracking may result from narrowing of the Tg spread by at least 5° C. relative to the control sample. Many of the samples reported in Table 1 also meet this test and are considered more preferred.

TABLE 1

Effect of Rejuvenating Agents on RAP Binders: DSC Analysis

| Ex | Description | Tg onset, °C | Tg spread, °C | Δ onset, °C | Δ spread, °C |
|---|---|---|---|---|---|
|  | Controls, ave. of 13 experiments | −36.7 | 47.5 | — | — |
| 1 | EG Monomerate, 2.5% | −41.4 | 46.2 | −4.7 | −1.3 |
| 2 | EG Monomerate, 5% | −47.8 | 47.0 | −11.1 | −0.5 |
| 3 | EG Monomerate, 10% | −50.9 | 41.4 | −14.2 | −6.1 |
| 4 | NPG Monomerate, 2.5% | −49.7 | 48.3 | −13.0 | 0.8 |
| 5 | NPG Monomerate, 5% | −49.4 | 43.0 | −12.7 | −4.5 |
| 6 | NPG Monomerate, 10% | −52.6 | 42.3 | −15.9 | −5.2 |
| C7 | Rheofalt ® distillate (cardanol) | −47.3 | 38.2 | −10.6 | −9.3 |
| C8 | Virgin asphalt, 100% | −37.9 | 42.4 | −1.2 | −5.1 |
| C9 | Palm oil | −51.0 | 54.1 | −14.3 | 6.6 |
| C10 | High-hydroxyl rosin ester | −31.6 | 46.8 | 5.1 | −0.7 |
| C11 | Nonyl phenol | −41.0 | 49.2 | −4.3 | 1.7 |
| C12 | Sylvares ® TP 96 | −29.8 | 36.5 | 6.9 | −11.0 |
|  | Controls, ave of 22 experiments | −35.8 | 46.9 | — | — |
| 13 | TMP ester rosin/TOFA | −52.6 | 42.7 | −16.8 | −4.2 |
| 14 | Uniflex ® 1803 (NPG glycerol Momomerate) | −57.5 | 63.0 | −21.7 | 16.1 |
| 15 | Glycerol Monomerate | −51.7 | 43.1 | −15.9 | −3.8 |
| 16 | TMP Monomerate | −50.2 | 43.7 | −14.4 | −3.2 |
| 17 | Uniflex ® 210 (NPG Monomerate) | −51.5 | 34.4 | −15.7 | −12.5 |
| 18 | EG ester of Monomer | −52.3 | 34.5 | −16.5 | −12.4 |
| 19 | 2-Ethylhexyl Monomerate | −55.5 | 37.6 | −19.7 | −9.3 |
| 20 | EG Monomerate/Sylvares ® TP 96 (1:1) | −42.8 | 41.9 | −7.0 | −5.0 |
| 21 | Uniflex ® 936E (TMP/MO6 fatty acid) | −47.7 | 48.5 | −11.8 | 1.6 |
| 22 | EG ester of crude dimer | −44.7 | 48.8 | −8.9 | 1.9 |
| 23 | 2-Ethylhexyl crude dimerate | −52.5 | 41.9 | −16.6 | −5.0 |
| 24 | Uniflex ® 102H (2-ethylhexyl dimerate) | −59.3 | 51.8 | −23.5 | 4.9 |
| 25 | Uniflex ® 10 (2-ethylhexyl dimerate) | −51.6 | 46.6 | −15.7 | −0.3 |
| 26 | Uniflex ® 540 (2 EH/NPG dimerate) | −52.6 | 52.1 | −16.8 | 5.2 |
| 27 | 2-Ethylhexyl trimerate | −48.8 | 46.9 | −12.9 | 0.1 |

Sylvares ® and Uniflex ® are trademarks of Arizona Chemical Company.
Rheofalt ® is a trademark of Ventraco, B.V.

Evaluation of Low, Intermediate and High Temperature Performance of RAP Binder Rejuvenating Agents by Dynamic Shear Rheometry (DSR)

Samples of RAP binder containing 10 wt. % of rejuvenating agents A, C, D, E, and F prepared as described above are submitted to an independent laboratory for evaluation of low, intermediate, and high-temperature properties using dynamic shear rheometry. Each of the samples, except for sample E, is found to be softened significantly by the rejuvenating agent. The rheological properties are used to assess rejuvenation products for use in high-RAP, hot and warm mix asphalt.

Dynamic shear moduli are measured using 4-mm diameter parallel plate geometry with a Malvern Kinexus® rotational dynamic shear rheometer. Frequency sweeps are performed at 15° C. intervals over a temperature range of −30 to 60° C. and an angular frequency range of 0.1 to 100 rad/sec (in some cases 0.1 to 50 rad/sec is used).

The control sample is an extracted binder without added rejuvenating agent. Stress sweeps are performed before each frequency sweep to ensure a low strain level and that the test results would be in the linear viscoelastic range.

High (70° C.) and in some cases low (−15° C.) performance parameters, such as G*/sin δ, master curves are extrapolated using the Christensen Anderson (CA) model (D. W. Christensen et al., J. Assoc. Asphalt Paving Technologists, 61 (1992) 67). The CA model relates the frequency dependence of the complex modulus to the glassy modulus ($G_g$), the cross-over frequency ($\omega_c$) and the rheological index (R). The form of the mathematical function is $$G*(\omega) = G_g \left[ 1 + \left(\frac{\omega_c}{\omega}\right)^{\left(\frac{\log 2}{R}\right)} \right]^{\frac{-R}{\log 2}}$$

The G(t) master curves are generated by interconverting the storage modulus (G'(ω)) using Christensen's approximate method (see Christensen, R. M., Theory of Viscoelasticity (1971) Academic Press, New York).

1. Low Temperature Properties

Low-temperature properties are measured with 4-mm plate rheometry. Bending beam rheometer (BBR) m-value and creep stiffness (S(t)) are estimated through a correlation developed by Sui et al ("A New Low-temperature Performance Grading Method using 4-mm Parallel Plates on a DSR," Transportation Research Record 2207 (2011) 43-48.).

M-value is the slope of the creep stiffness curve at the performance grade temperature plus 10° C. at 60 seconds. It is an indication of the asphalt's ability to relax stress. A minimum m-value of 0.3 is typically specified for laboratory RTFO/PAV (rolling thin film oven/pressure aging vessel) aged asphalts. Creep stiffness is used to evaluate the potential for high thermal stress development. A higher creep stiffness value indicates higher potential thermal stress development in the pavement, a maximum value of 300 MPa is typically specified. Creep stiffness is measured at the same time and temperature as m-value. Results appear in Table 2.

2. Intermediate Temperature Properties

Fatigue cracking resistance of an RTFO/PAV aged asphalt binder is typically evaluated using G*sin δ (a fatigue factor). G* represents the binder complex shear modulus and δ represents the phase angle. G* approximates stiffness and δ approximates the viscoelastic response of the binder. Binder purchase specifications typically require the factor to be less than 5 MPa. The factor is considered a measure of energy dissipation which is related to fatigue damage. The critical temperature range for fatigue damage is near the midpoint between the highest and lowest service temperatures. A test temperature of 25° C. is used. Results appear in Table 2.

3. High-temperature Properties

High-temperature mechanical properties are evaluated by the parameter G*/sin δ. The factor is an indication of a binder's resistance to rutting. Binder purchase specifications typically require the factor to be greater than 2.2 kPa for RTFO aged asphalt and greater than 1 kPa before RTFO aging. In all of the tested samples, G*/sin δ decreases significantly with addition of the rejuvenating agent.

As shown in Table 2, samples A, C, and F show the most improvement in m-value, which directly relates to improvement in the ability of the material to relax and avoid thermal stress development that could lead to thermal cracking. G*sin δ provides an indication of fatigue performance. Samples F (glycerol Monomerate) and A (EG Monomerate) stand out as the highest ranked in terms of both (m-value) and (G*sin δ) improvement. Samples C and D are somewhat effective. Comparative sample E (terpene phenol) is particularly ineffective.

TABLE 2

Evaluation of Low, Intermediate, and High Temperature Performance of RAP Binder Rejuvenating Agents by Dynamic Shear Rheometry

| | control | A | C* | D | E* | F |
|---|---|---|---|---|---|---|
| Creep stiffness, −15° C., MPa | 67 | 22 | 22 | 25 | 57 | 21 |
| m-Value, −15° C. | −0.42 | −0.56 | −0.61 | −0.55 | −0.47 | −0.61 |
| % improvement | — | 33 | 45 | 31 | 12 | 45 |
| G* sin δ, 25° C., kPa | 7694 | 518 | 631 | 1392 | 7525 | 397 |
| % improvement | — | 93 | 92 | 82 | 2.2 | 95 |
| G*/sin δ, 70° C., kPa | 47 | 2.5 | 1.6 | 3.0 | 6.5 | 3.5 |
| Overall rank | — | 2 | 3 | 4 | 5 | 1 |

*Comparative examples
A = EG Monomerate; C = Cardanol; D = 50/50 blend of A and E; E = Sylvares ® TP-96 terpene phenol; F = glycerol Monomerate Cloud Point, Pour Point, and Low-temperature Performance Cloud point is found by cooling a neat, molten sample gradually and observing the temperature at which the clear sample just becomes hazy. Pour point is the lowest temperature at which a liquid sample remains pourable.

Table 3 summarizes these properties for samples of aged binder and for the rejuvenating agents listed in the table. As shown in Table 3, the rejuvenating agents with the best low-temperature properties are those with relatively low cloud and pour points. Of particular note are rejuvenating agents that comprise the fatty esters from improved thermal stability alcohols (neopentyl glycol, pentaerythritol, etc.), which have exceptionally low cloud points (less than −25° C.) and pour points (less than −50° C.) These additives do not undergo phase changes within the temperature window for the binder's application and generally deliver excellent low- and high-temperature performance to the rejuvenated binder.

TABLE 3

Low-Temperature Properties of Aged Binder and Various Rejuvenating Agents

| | Cloud Point (° C.) | Pour Point (° C.) | Low T properties |
|---|---|---|---|
| Aged Binder (AB) | not applicable | >20 | very poor |
| petroleum wax* | >20 | >20 | very poor |
| petroleum flux oil* | not available | 10 | poor |
| vegetable oil[7]* | −11 to >20 | −20 to 22 | very poor to fair |
| cardanol* | not available | −32 | good |
| fatty ester[1,3] | −20 to 14 | −37 to −4 | very poor to good |
| fatty ester[2,4] | <−25 | −58 to −55 | excellent |
| rosin ester | >20 | >20 | very poor |
| fatty monomer ester[1,5] | 15 to 28 | 4 | very poor to poor |
| fatty monomer ester[2,6] | 2 | −10 | poor to fair |
| rosin ester/fatty monomer ester[2] blend | not available | −13 | fair |
| rosin ester/fatty ester[2] blend | <−25 | −1 to −17 | fair to excellent |

[1]From alcohols other than improved thermal stability alcohols.
[2]From "improved thermal stability alcohol," e.g., TMP, TME, NPG, PE, de-PE.
[3]Representative examples: glycerol tallate, EG tallate, 2-ethylhexyl tallate, octyl tallate, methyl tallate, PEG (200) tallate.
[4]Representative examples: TMP isotearate, TMP tallate, PE tallate.
[5]Representative examples: glycerol Monomerate, 2-ethylhexyl Monomerate.
[6]Representative example: TMP Monomerate.
[7]Representative examples: palm, canola, sunflower, peanut, soybean oils.
*Comparitive examples Miscibility of Aged and Rejuvenated Binders Miscibility is determined by an exudation droplet test (see Shell Bitumen Handbook (2003), Chapter 4, p. 53 and "Quality of Paving Grade Bitumen—A Practical Approach in Terms of Functional Tests," 4th Eurobitume Symposium, Madrid (October 1989) 290). The test involves placing droplets of the treated bitumen in cells on a white marble test plate (50×50×6 mm) having five 1 mm×10 mm sample recesses. On each tile, a control sample, three samples of the bitumen treated with an additive at 10% dosage for better differentiation, and a sample treated with paraffin wax at 10% dosage are measured into separate cells. The control sample is the untreated bitumen used as a zero point. The paraffin wax is used as a standard known to be immiscible with high leaching used for normalization across plates. The tiles are placed in a 60±1° C. oven for 96 h under a steady nitrogen flow.

An image of the cells is taken using a UV camera at 366 nm. Measurements are made using a microscope both at eight points around each cell, as well as from the calculated average radii for each sample based upon the areas of the auras and the respective cells. The two methods of measurement agree well with each other. The exudation distances of the samples treated with experimental additives are normalized as a percentage between the control (0%) and the sample treated with paraffin wax (100%). The experimental treated samples are then compared.

Table 4 summarizes the results. We found that cyclic compositions such as rosin esters and rosin ester blends demonstrate good to excellent miscibility with aged binder in the test, indicating a reduced tendency to leach, as is seen, e.g. with vegetable oil or hydrocarbon waxes.

TABLE 4

Miscibility of Aged Binder and Combinations of Aged Binder and Rejuvenating Agents.

|  | Exudation (mm) | Disirability |
|---|---|---|
| Aged binder (AB) | 0.8 | Good |
| AB + rosin ester | 0.3 | Excellent |
| AB + rosin ester/fatty ester blend | 0.4 | Excellent |
| AB + rosin ester/fatty monomer ester blend | 0.6 | Good |
| AB + petroleum flux oil* | 0.6 | Good |
| AB + fatty ester* | 0.8-1.0 | Good to Fair |
| AB + vegetable oil* | 0.9-1.0 | Fair |
| AB + petroleum wax* | 2.2 | Poor |

*Comparative example

Table 5 summarizes the cyclic content of ester-functional materials used for restoring the properties of virgin binder. Note that each of the compositions used has at least 5 wt. % of cyclic content. The amount of cyclic content in the rejuvenating agent is conveniently varied as desired by blending components having higher or lower cyclic content, as the needs for a particular aged binder may dictate. Table 6 provides representative examples from each of the general classes of ester-functional rejuvenating agents listed in Tables 5 and 8.

TABLE 5

Cyclic Content of Esters used for Restoration

| | Average Content Ratio (mol. %) | | | | |
|---|---|---|---|---|---|
| | Acyclic | Mono-cyclic | Bicyclic | Polycyclic | Overall % Cyclic |
| aromatic esters | 0-75 | 25-100 | 25-100 | 25-100 | 25-100 |
| ester of fatty monomer and fatty acid | 80-93 | 4-16 | 1-4 | 0-2 | 7-20 |
| esters of fatty acid and rosin | 22-79 | 0 | 0 | 21-78 | 21-78 |
| esters of fatty monomer | 70-80 | 15-25 | 0-10 | 0-5 | 20-30 |
| ester of fatty trimer | 5-15 | 60-70 | 15-25 | 0-10 | 85-95 |
| ester of fatty dimer and fatty acid | 32-81 | 14-57 | 3-10 | 1-2 | 19-68 |
| esters of fatty dimer | 10-20 | 65-75 | 10-20 | 0-5 | 80-90 |
| esters of rosin dimer | 0-5 | 0-5 | 0-5 | 85-100 | 85-100 |
| ester of fatty monomer and rosin | 4-61 | 0-16 | 0-4 | 19-97 | 39-96 |
| ester of fatty dimer and rosin | 6-13 | 14-57 | 3-10 | 20-77 | 87-94 |
| ester of fatty trimer and rosin | 5-8 | 13-42 | 4-14 | 36-78 | 92-95 |
| ester of fatty acid and rosin dimer | 22-79 | 0 | 0 | 21-78 | 21-78 |

TABLE 6

Representative Examples of Ester-Functional Rejuvenating Agents

| Class | Examples |
|---|---|
| aromatic esters | oleyl benzoate, benzyl tallate |
| ester of fatty monomer and fatty acid | TMP ester of blended tall oil fatty monomer and tall oil fatty acid, glycerol ester of blended tall oil fatty monomer and tall oil fatty acid |
| esters of fatty acid and rosin | TMP ester of blended tall oil fatty acid and tall oil rosin, glycerol ester of blended tall oil fatty acid and tall oil rosin |
| esters of fatty monomer | TMP Monomerate, glycerol Monomerate, 2-EH Monomerate |
| ester of fatty trimer | TMP ester of tall oil fatty trimer, glycerol ester of tall oil fatty trimer |
| ester of fatty dimer and fatty acid | TMP ester of blended tall oil fatty acid and tall oil fatty dimer, glycerol ester of blended tall oil fatty acid and tall oil fatty dimer |
| esters of fatty dimer | stearyl ester of tall oil fatty dimer, 2-EH ester of tall oil fatty dimer |
| esters of fatty acid + ester of rosin | TMP ester of blended tall oil fatty acid and tall oil rosin, glycerol ester of blended tall oil fatty acid and tall oil rosin |
| esters of rosin dimer | stearyl ester of tall oil rosin dimer, 2-EH ester of tall oil rosin dimer |
| ester of fatty monomer and rosin | TMP ester of blended tall oil fatty monomer and tall oil rosin, glycerol ester of blended tall oil fatty monomer and tall oil rosin |
| esters of fatty acid | glycerol tallate, TMP tallate, PE tallate, 2-EH tallate. |
| esters of rosin | glycerol ester of rosin, TMP ester of rosin, PE ester of rosin |
| vegetable oils | palm oil, canola oil, sunflower oil, peanut oil, soybean oil |

Additional Evaluation of Tall Oil-Derived Rejuvenating Agents

The binders tested are aged binder recovered from reclaimed asphalt and laboratory aged binder (both identified as "AB").

Aged binder is prepared in two steps. The first step is the rolling thin film oven (RTFO) test, which is performed in accord with EN 12607-1. This reflects short-term aging that normally occurs during manufacture, transport, and laying of asphalt. The RTFO test involves heating binder in glass cylinders on a rotating carousel in an air-blown oven at 163° C. for 75 minutes after it reaches the desired temperature. After the test, mass loss is recorded and binder properties are measured. The second step is pressure aging vessel (PAV) testing in accord with EN 14769. In the PAV test, binder samples are heated in an oven at 90 to 110° C. under 2.07 MPa of pressure for 20 h. After the test, mass loss is recorded and binder properties are measured.

Dynamic Shear Rheometry Test Method:

Isochronal or temperature ramp data is collected in two ramps on 8-mm parallel plates at an angular frequency of 10 rad/s between −15 and 120° C., at a ramp rate of 6.00° C./min. Although this is a very short temperature equilibration time, it is sufficient to contrast different materials with one another when all were tested under the same conditions. Normal force is set at 0.0 N with a tolerance of 0.10 N throughout. For the first temperature ramp, torque is controlled at 5000.0 μN·m. When the percent strain exceeds 15.00%, the second temperature ramp begins, changing the control variable from torque at 5000.0 μN·m to percent strain at 15.00%.

Isothermal or frequency sweep data is collected on 8-mm parallel plates for angular frequencies of 0.1000 to 10.00 Hz, and at 60, 40, 20, 10, 5, 0, −5, and −10° C. No normal force control is used except when it is out of range at lower temperatures (for example, 5° C. and below). The percent strain varies, but is usually between 0.00700 and 0.00800% and is based upon a strain sweep. The master curve of G* at 20° C. produced from isothermal data collection is most accurate at intermediate temperatures, but it can also be used to predict high and low temperature behavior.

Table 7 gives sample rheology data from master curves of G* generated at 20oC from isothermal frequency sweeps. Similar data is generated for a wide variety of rejuvenating agents. The G* and phase angles (δ) measured are used to compare high-temperature and low-temperature (fatigue) criteria for these compositions. Table 8 groups the results according to various classes of rejuvenating agents (e.g., aromatic esters or rosin esters).

vegetable oils, petroleum flux oils, or fatty esters. Because the cyclic-containing compositions are not as good at softening bitumen when they are the sole component, a combination of cyclic and acyclic compositions may strike a more favorable balance of providing good softening and altered temperature sensitivity.

The preceding examples are meant only as illustrations; the following claims define the scope of the invention.

TABLE 7

Complex Modulus (G*) as a Function of Shift Frequency

| Shift frequency (Hz) | $10^{-3}$ | $10^{-2}$ | $10^{-1}$ | $10^{0}$ | $10^{1}$ | $10^{2}$ | $10^{3}$ | $10^{4}$ |
|---|---|---|---|---|---|---|---|---|
| Aged binder (AB) | $8.5 \times 10^4$ | $5.3 \times 10^5$ | $2.3 \times 10^6$ | $1.2 \times 10^7$ | $2.1 \times 10^7$ | $8.0 \times 10^7$ | $1.8 \times 10^8$ | $2.9 \times 10^8$ |
| Virgin binder, PG64-22 | $1.8 \times 10^4$ | $5.0 \times 10^4$ | $3.2 \times 10^5$ | $1.3 \times 10^6$ | $6.0 \times 10^6$ | $2.5 \times 10^7$ | $8.0 \times 10^7$ | $1.8 \times 10^8$ |
| AB + petroleum flux oil | $2.3 \times 10^4$ | $1.2 \times 10^5$ | $6.5 \times 10^5$ | $4.2 \times 10^6$ | $1.4 \times 10^7$ | $5.0 \times 10^7$ | $1.3 \times 10^8$ | $2.3 \times 10^8$ |
| AB + vegetable oil | $1.2 \times 10^4$ | $3.8 \times 10^4$ | $2.4 \times 10^5$ | $1.2 \times 10^6$ | $4.3 \times 10^6$ | $1.5 \times 10^7$ | $4.0 \times 10^7$ | $9.0 \times 10^7$ |
| AB + rosin ester | $3.5 \times 10^4$ | $2.0 \times 10^5$ | $1.2 \times 10^6$ | $6.5 \times 10^6$ | $2.2 \times 10^7$ | $7.5 \times 10^7$ | $1.8 \times 10^8$ | $2.8 \times 10^8$ |
| AB + rosin ester/fatty ester blend | $2.5 \times 10^4$ | $1.1 \times 10^5$ | $6.2 \times 10^5$ | $3.2 \times 10^6$ | $1.2 \times 10^7$ | $4.0 \times 10^7$ | $1.0 \times 10^8$ | $2.0 \times 10^8$ |

Master curves of G* generated at 20° C. from isothermal frequency sweeps. Rheology data collected using 8-mm plates. Isochronal data collected at 10 Hz between −15° C. and 90° C. Isothermal data collected between 0.01 and 100 Hz at 60, 40, 20, 15, 10, 0, and −5° C. Binder aged according to EN 12607-1 (163° C., 85 min) and EN 14769 (90° C., 300 psi, 20 h).

TABLE 8

Summary of Fatigue and High Temperature Criteria for Binders

| | Fatigue Criteria<br>Temperature at which G*sin<br>δ at 10 rad/s = $5.0 \times 10^6$ Pa<br>(° C.) | High T Criteria<br>Temperature at which G*/sin<br>δ at 10 rad/s = 1000 Pa (° C.) | Temperature Sensitivity[2] |
|---|---|---|---|
| Virgin Binder (PG64-22 specification) | 25 | 64 | Excellent |
| Aged Binder[1] (AB) | 24 | 84 | Poor |
| AB + aromatic esters | -1 to 4 | 58 to 63 | Good restoration[4] |
| AB + ester of fatty monomer and fatty acid | 10 | 68 | Fair restoration |
| AB + esters of fatty acid and rosin | 6 to 19 | 57 to 76 | Good restoration[3] |
| AB + esters of fatty monomer | 12 | 66 to 71 | Low restoration[4] |
| AB + ester of fatty trimer | 15 | 73 | Fair restoration[4] |
| AB + ester of fatty dimer and fatty acid | 15 | 78 | Good restoration[4] |
| AB + esters of fatty dimer | 11 to 15 | 69 to 73 | Fair restoration[4] |
| AB + esters of fatty acid and ester of rosin blend | 11 to 20 | 61 to 72 | Good restoration[3] |
| AB + esters of rosin dimer | 17 to 22 | 67 to 72 | Good restoration[3] |
| AB + ester of fatty monomer and rosin | 18 | 76 | Fair restoration[4] |
| AB + esters of fatty acid* | 0 to 9 | 53 to 68 | Low restoration[4] |
| AB + esters of rosin | 18 to 2 | 65 to 82 | Good restoration[3] |
| AB + vegetable oils* | 0 to 14 | 54 to 71 | Low restoration[4] |
| AB + petroleum flux oils* | 13 to 20 | 72 to 74 | Low restoration[3] |
| AB + lignin* | 27 | 82 | Low restoration[4] |

[1]PEN 30/50 binder aged by rolling thin-film oven test (EN 12607-1, 163° C., 85 min, for short-term aging effects) and pressure aging vessel (EN 14769, 90° C., 2.07 MPa, 20 h, for long-term aging effects).
[2]Temperature sensitivity is a rheological measure of a binder's viscoelastic response to temperature changes. The ability of an additive to alter or restore this property in aged binder serves as a gauge of additional restoration effects apart from softening.
[3]Improvement in temperature sensitivity by increased slope.
[4]Improvement in temperature sensitivity by decreased slope.
*Comparative examples As noted earlier, an alteration in temperature sensitivity can be indicated by either an increase or a decrease in the slope of the line in a plot of fatigue criteria on the vertical axis (i.e., the temperature in ° C. at which G*sin δ at 10 rad/s=$5.0 \times 10^6$ Pa) versus high temperature criteria on the horizontal axis (i.e., the temperature in ° C. at which G*/sin δ at 10 rad/s=1000 Pa). As shown in Table 8, compositions that offer the best ability to restore the temperature sensitivity of virgin binder to the aged material, or improve the temperature sensitivity beyond that of virgin binder, tend to have a high content of cyclic components (e.g., aromatic esters, rosin esters, dimerized rosin esters). Note the relatively low capability to restore temperature sensitivity for

We claim:
1. An asphalt composition consisting of:
reclaimed asphalt consisting of aggregate and an aged asphalt binder,
a rejuvenating agent,
optionally, a polyterpene, a terpene phenol, a tall oil pitch, a tall oil pitch derivative, a sterol, an alkylated phenol, an α-methylstyrene polymer, or mixtures thereof, and
optionally, virgin asphalt,
wherein the rejuvenating agent:
(a) is present in an amount within the range of 0.1 to 20 wt. % based on the combined amounts of aged binder and rejuvenating agent;

(b) has a cyclic content of at least 5 wt. %; and
(c) is an ester or ester blend derived from
    an acid selected from the group consisting of aromatic acids, fatty acids, fatty acid monomers, fatty acid dimers, fatty acid trimers, rosin acids, rosin acid dimers, and mixtures thereof; and
    an improved thermal stability alcohol selected from the group consisting of trimethylolethane, trimethylolpropane, neopentyl glycol, pentaerythritol, dipentaerythritol, benzylic alcohols, and mixtures thereof; and
wherein the composition has a cloud point less than −20° C. and a pour point less than −30° C.

2. The composition of claim 1, wherein the rejuvenating agent is present in an amount of 0.5 to 10 wt. %.

3. The composition of claim 1, wherein said virgin asphalt consists of virgin binder and virgin aggregate, wherein the virgin aggregate is present in the asphalt composition in an amount of 1 to 99 wt. % based on the combined amounts of virgin asphalt, reclaimed asphalt, and rejuvenating agent.

4. The composition of claim 1 wherein rejuvenating agent is a tall oil-derived fatty ester, a rosin ester, or a mixture thereof.

5. The composition of claim 4 wherein the rejuvenating agent consists of 10 to 90 wt. % of a tall oil-derived fatty ester and 10 to 90 wt. % of a rosin ester.

6. The composition of claim 4 wherein the tall oil-derived fatty ester derives from an acid selected from the group consisting of fatty acid monomers, fatty acid dimers, fatty acid trimers, and mixtures thereof.

7. The composition of claim 4 wherein the rosin ester is derived from a rosin acid, wherein the rosin acid is derived from tall oil rosin, wood rosin, gum rosin, or mixtures thereof.

8. The composition of claim 4 wherein the rosin ester derives from an acid selected from the group consisting of abietic acid, neoabietic acid, dehydroabietic acid, pimaric acid, levopimaric acid, sandaracopimaric acid, isopimaric acid, palustric acid, and mixtures thereof.

9. The composition of claim 1 wherein the rejuvenating agent has a cyclic content of at least 10 wt. %.

10. The composition of claim 1 wherein the rejuvenating agent has a cyclic content within the range of 5 to 95 wt. %.

11. The composition of claim 1 wherein the rejuvenating agent is present in an amount effective to reduce the glass-transition onset temperature of the aged asphalt binder by at least 5° C. compared with the glass-transition onset temperature of the aged asphalt binder without the rejuvenating agent.

12. The composition of claim 1 wherein the rejuvenating agent is a tall oil-derived fatty ester.

13. The composition of claim 1 wherein the rejuvenating agent is present in an amount effective to both soften the aged binder and restore its temperature sensitivity compared with that of the aged binder without the rejuvenating agent.

14. A paved surface comprising the asphalt composition of claim 1.

15. A method which comprises combining reclaimed asphalt consisting of aggregate and an aged asphalt binder; a rejuvenating agent;
    optionally, a polyterpene, a terpene phenol, a tall oil pitch, a tall oil pitch derivative, a sterol, an alkylated phenol, an α-methylstyrene polymer, or mixtures thereof, and
    optionally, virgin asphalt;
    wherein the rejuvenating agent:
        (a) is used in an amount from 0.1 to 20 wt. % based on the combined amounts of aged binder and rejuvenating agent;
        (b) has a cyclic content of at least 5 wt. %; and
        (c) is an ester or ester blend derived from
            an acid selected from the group consisting of aromatic acids, fatty acids, fatty acid monomers, fatty acid dimers, fatty acid trimers, rosin acids, rosin acid dimers, and mixtures thereof; and
            an improved thermal stability alcohol selected from the group consisting of trimethylolethane, trimethylolpropane, neopentyl glycol, pentaerythritol, dipentaerythritol, benzylic alcohols, and mixtures thereof; and
    wherein the composition has a cloud point less than −20° C. and a pour point less than −30° C.

16. The method of claim 15 wherein the rejuvenating agent has a cyclic content of at least 10 wt. %.

* * * * *